(12) United States Patent
Gyotoku

(10) Patent No.: US 8,218,035 B2
(45) Date of Patent: Jul. 10, 2012

(54) IMAGE PROCESSING APPARATUS, CONTROL METHOD THEREOF, AND PROGRAM

(75) Inventor: Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 12/128,786

(22) Filed: May 29, 2008

(65) Prior Publication Data
US 2008/0304765 A1 Dec. 11, 2008

(30) Foreign Application Priority Data
Jun. 5, 2007 (JP) ................................ 2007-149641

(51) Int. Cl.
H04N 5/217 (2011.01)
H04N 5/335 (2011.01)
(52) U.S. Cl. ........................................ 348/241; 348/275
(58) Field of Classification Search .................... 348/241
See application file for complete search history.

(56) References Cited

U.S. PATENT DOCUMENTS

| | | | |
|---|---|---|---|
| 6,618,512 B1 * | 9/2003 | Yamaguchi | 382/319 |
| 6,665,455 B1 * | 12/2003 | Ting | 382/312 |
| 6,995,794 B2 * | 2/2006 | Hsu et al. | 348/241 |
| 7,787,030 B2 * | 8/2010 | Fridrich et al. | 348/241 |
| 2005/0104997 A1 * | 5/2005 | Nonaka | 348/360 |
| 2005/0162531 A1 * | 7/2005 | Hsu et al. | 348/222.1 |
| 2007/0127841 A1 * | 6/2007 | Takayama et al. | 382/275 |
| 2007/0177188 A1 * | 8/2007 | Wollmershauser et al. | 358/1.15 |
| 2007/0285522 A1 * | 12/2007 | Kimura | 348/208.99 |

FOREIGN PATENT DOCUMENTS

| | | |
|---|---|---|
| JP | 2002-209147 | 7/2002 |
| JP | 2002-281250 A | 9/2002 |
| JP | 2005-142951 A | 6/2005 |

OTHER PUBLICATIONS

The above reference was cited in a Jul. 22, 2011 Japanese Office Action, which is enclosed without English Translation, that issued in Japanese Patent Application No. 2007-149641.

* cited by examiner

Primary Examiner — Lin Ye
Assistant Examiner — Amy Hsu
(74) Attorney, Agent, or Firm — Cowan, Liebowitz & Latman, P.C.

(57) ABSTRACT

An image processing apparatus which corrects image data containing an image of a foreign substance, and outputs the corrected image data that has undergone correction as a visible image includes an image pixel count acquisition unit which acquires the number of pixels of the image, an output resolution acquisition unit which acquires information about the resolution of the image to be output to the output device, a foreign substance correction level setting unit which sets the degree of foreign substance correction on the basis of at least the number of pixels acquired by the image pixel count acquisition unit and the information about the resolution acquired by the output resolution acquisition unit, and a foreign substance correction unit which corrects the image of the foreign substance contained in the image data on the basis of the foreign substance correction level set by the foreign substance correction level setting unit.

12 Claims, 17 Drawing Sheets

FIG. 7

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>   RADIUS (2 BYTES)<br>     x-COORDINATE OF CENTER (2 BYTES)<br>     y-COORDINATE OF CENTER (2 BYTES) |
| | | PARAMETERS OF DUST REGION $D_2$ |
| | | . . . |
| | | PARAMETERS OF DUST REGION $D_n$ |

FIG. 15

| PAPER SIZE |
|---|
| L |
| 2L |
| POSTCARD |
| A4 |
| Card |
| Default |

FIG. 16

| PAPER TYPE |
|---|
| Photo |
| FastPhoto |
| Default |

FIG. 17

| LAYOUT |
|---|
| 1-Up Borderless |
| 1-Up |
| 2-Up |
| 4-Up |

FIG. 21

| DUST CORRECTION CONDITION | USER CORRECTION LEVEL | | | |
|---|---|---|---|---|
| | OFF | WEAK | MEDIUM | STRONG |
| WEAK | OFF | WEAK | MEDIUM | STRONG |
| STRONG | OFF | MEDIUM | STRONG | STRONG STRONG |

IMAGE PROCESSING APPARATUS, CONTROL METHOD THEREOF, AND PROGRAM

BACKGROUND OF THE INVENTION

1. Field of the Invention

The present invention relates to an image correction technique of removing, from an image, a foreign substance which sticks to the optical system of an image capturing apparatus such as a digital camera.

2. Description of the Related Art

In a lens interchangeable digital single-lens reflex camera, conventionally, when a foreign substance such as dust sticks to the image capturing optical system (especially on the surface of an optical element such as a low-pass filter arranged in front of the image sensor), captured images may contain the image of the foreign substance. In this case, since the shot images output to various destinations (e.g., a liquid crystal monitor and a printer) also contain the image of the foreign substance, the image quality degrades.

To solve this problem, the following proposal has been made. First, an object having, e.g., a solid white color is shot to obtain an image containing an image of dust in the image capturing optical system. The position information of the dust in the image capturing optical system is obtained from the image. Correction processes (e.g., removal, color correction, and interpolation based on neighboring pixels) are executed for the finally shot image on the basis of the position information. With this process, the corrected image contains no dust any more. It is therefore possible to output the image to an output destination such as a printer and cause it to print a dust-free image. This leads to an increase in the output image quality (Japanese Patent Laid-Open No. 2002-209147).

However, the dust correction may only degrade the image quality depending on the object state around the dust. For example, assume that objects without a solid color (e.g., buildings that stand close together) exist around the dust. In this case, smearing may occur in the object upon dust correction, and a sense of incongruity may be generated between the dust region and its periphery. If the correction condition (e.g., the portion around the dust needs to have a solid color) is uniformly made stricter to prevent the sense of incongruity around the dust upon correction, the dust can rarely be corrected.

Hence, an image in which smearing has occurred in the object, or an image in which dust has rarely been corrected is output. This degrades the output image quality after all.

SUMMARY OF THE INVENTION

The present invention has been made in consideration of the above-described problems, and has as its object to optimize a dust correction condition and increase the quality of an image to be output.

In order to solve the above-described problems and achieve the object, according to the first aspect of the present invention, there is provided an image processing apparatus which corrects image data containing an image of a foreign substance by removing the image of the foreign substance, the foreign substance sticking to an optical element arranged in front of an image sensor for photoelectrically converting an object image, and outputs corrected image data that has undergone correction as a visible image, comprising an image pixel count acquisition unit adapted to acquire the number of pixels of the image of the image data, an output resolution acquisition unit adapted to acquire information about a resolution of the image to be output to the output device, a foreign substance correction level setting unit adapted to set a degree of foreign substance correction on the basis of at least the number of pixels acquired by the image pixel count acquisition unit and the information about the resolution acquired by the output resolution acquisition unit, and a foreign substance correction unit adapted to correct the image of the foreign substance contained in the image data on the basis of the foreign substance correction level set by the foreign substance correction level setting unit.

According to the second aspect of the present invention, there is provided a method of controlling an image processing apparatus which corrects image data containing an image of a foreign substance by removing the image of the foreign substance, the foreign substance sticking to an optical element arranged in front of an image sensor for photoelectrically converting an object image, and outputs corrected image data that has undergone correction as a visible image, comprising the steps of acquiring the number of pixels of the image of the image data, acquiring information about a resolution of the image to be output to the output device, setting a degree of foreign substance correction on the basis of at least the number of pixels acquired in the image pixel count acquiring step and the information about the resolution acquired in the output resolution acquiring step, and correcting the image of the foreign substance contained in the image data on the basis of the foreign substance correction level set in the foreign substance correction level setting step.

Further features of the present invention will become apparent from the following description of exemplary embodiments with reference to the attached drawings.

BRIEF DESCRIPTION OF THE DRAWINGS

FIG. 7 is a view showing an example of the data format of dust correction data;

FIG. 15 is a view showing a screen displayed on the LCD monitor device 417 to designate a paper size that is a condition necessary for printing;

FIG. 16 is a view showing a screen displayed on the LCD monitor device 417 to designate a paper type that is another condition necessary for printing;

FIG. 17 is a view showing a screen displayed on the LCD monitor device 417 to designate a layout that is still another condition necessary for printing;

FIG. 21 is a view showing an example of a correction level table;

DESCRIPTION OF THE EMBODIMENTS

An embodiment of the present invention will be described below with reference to the accompanying drawings, in which a lens interchangeable digital single-lens reflex camera is connected to a printer of an output destination and used under a direct print environment based on the PictBridge standard. The digital single-lens reflex camera and the printer form an image processing system of the embodiment. The printer prints image data transmitted from the digital single-lens reflex camera as a visible image.

Figure 1:
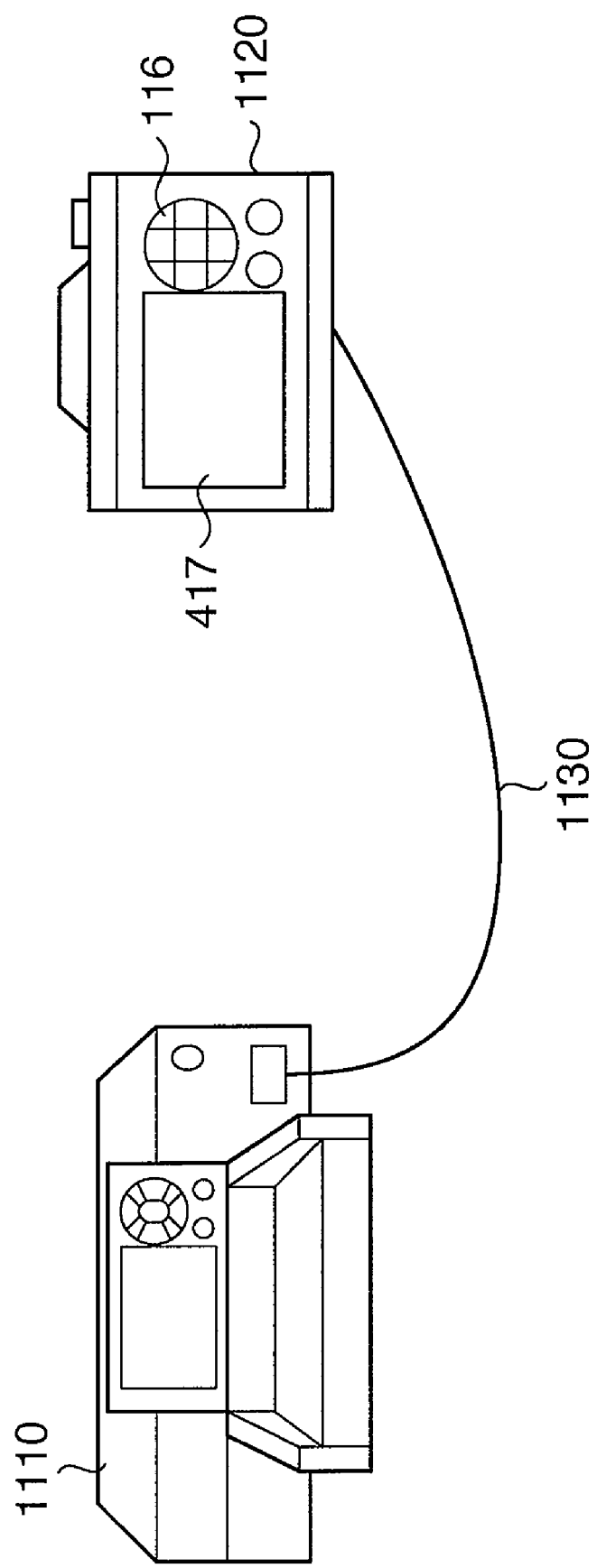
FIG. 1 is a view showing a state in which a lens interchangeable digital single-lens reflex camera according to an embodiment of the present invention is connected to a printer.

FIG. 1 is a view showing a state in which a lens interchangeable digital single-lens reflex camera according to an embodiment of the present invention is connected to a printer.

Referring to FIG. 1, a digital single-lens reflex camera 1120 has an LCD monitor device 417 and a cross key switch (SW) 116. A communication cable 1130 such as a USB cable connects the digital single-lens reflex camera 1120 to a printer 1110.

Figure 2:
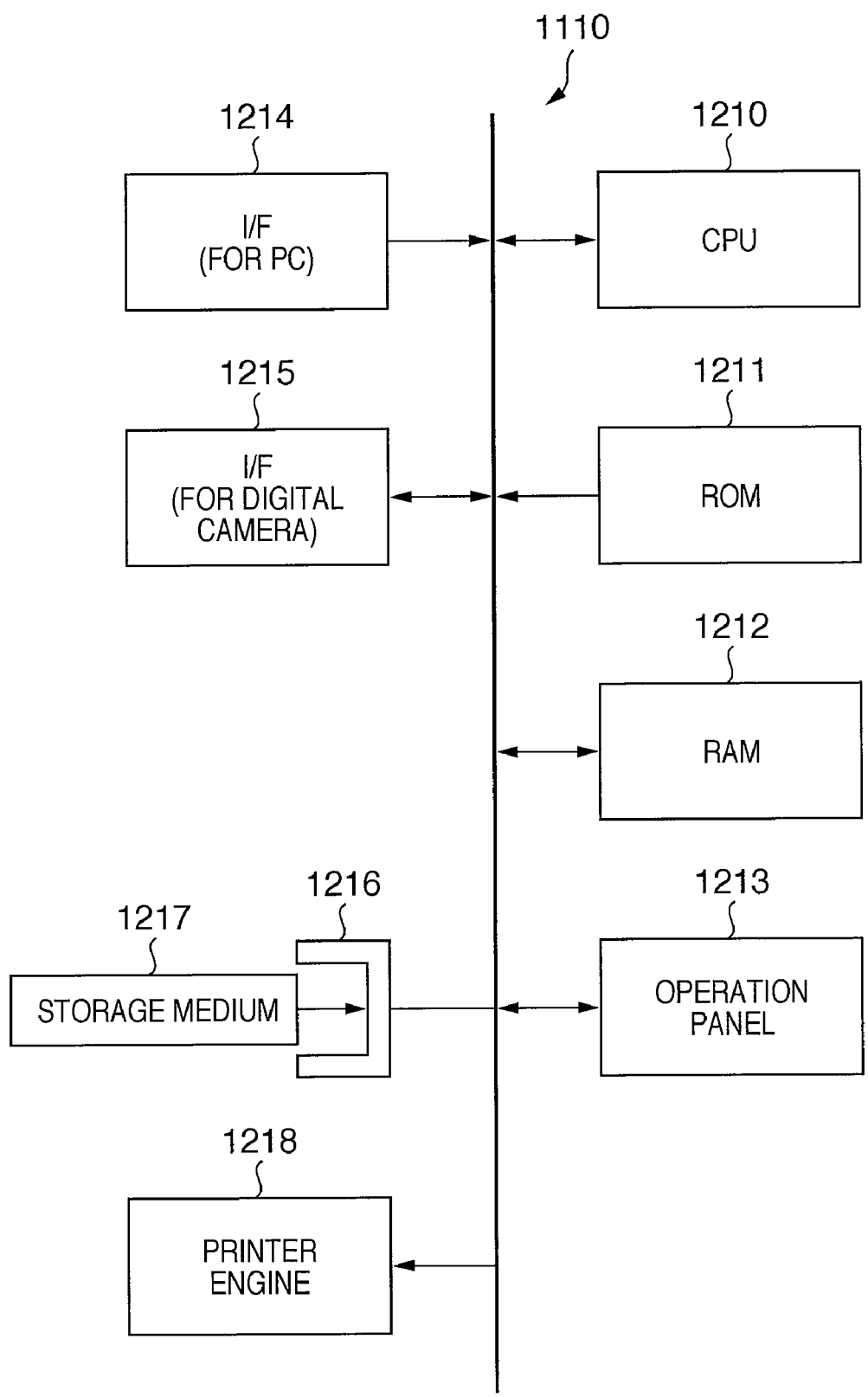
FIG. 2 is a block diagram showing the arrangement of the control system of the printer.

FIG. 2 is a block diagram showing the arrangement of the control system of the printer 1110 according to this embodiment.

Referring to FIG. 2, a CPU 1210 controls the entire apparatus. A ROM 1211 stores fonts and the operation procedures (programs) of the CPU 1210. A RAM 1212 serves as the work area of the CPU 1210. Reference numeral 1213 denotes an operation panel. An interface 1214 connects the printer to a PC (Personal Computer). An interface (USB host side) 1215 connects the printer to the digital single-lens reflex camera 1120. A card interface 1216 is connectable to an adapter (PCMCIA) 1217 incorporating a storage medium such as a memory card. The card interface 1216 is used by the printer 1110 to read out a DPOF, i.e., a description file related to a print instruction for image data that is shot by the digital single-lens reflex camera 1120 and stored in a memory card and print the image data in accordance with the DPOF. Reference numeral 1218 denotes a printer engine.

Figure 3:
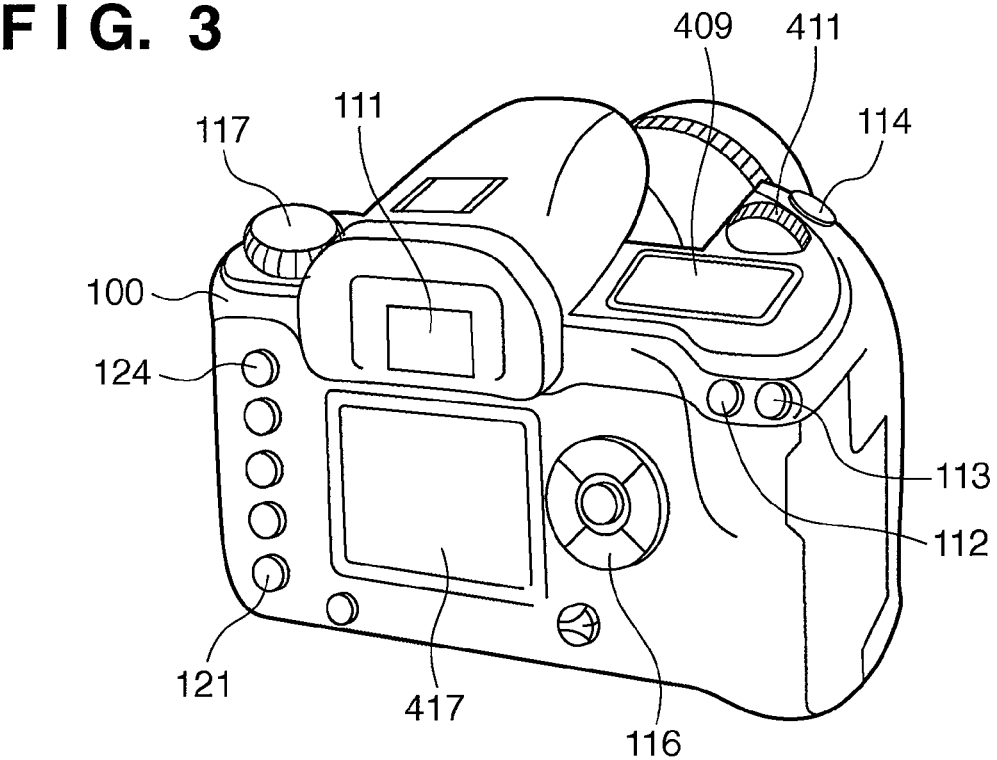
FIG. 3 is a perspective view showing the outer appearance of the digital camera.
Figure 4:
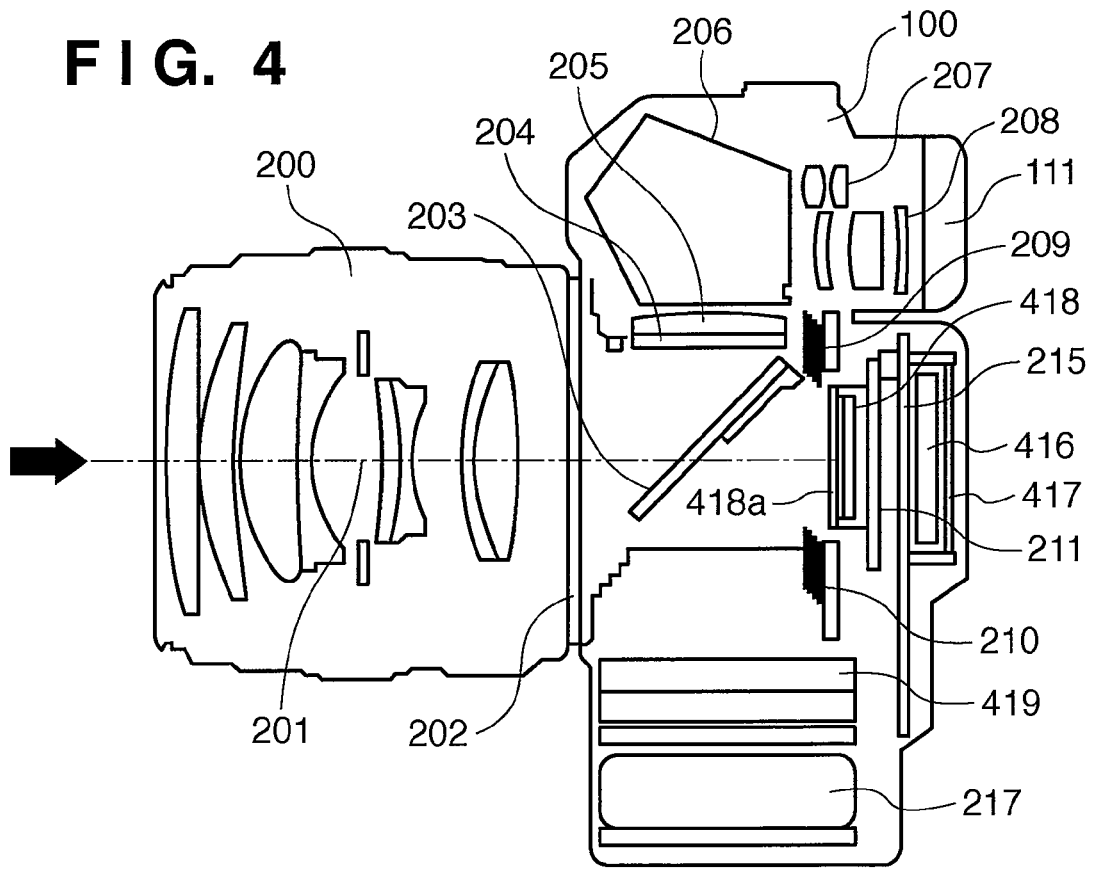
FIG. 4 is a longitudinal sectional view showing the internal structure of the digital camera.

FIG. 3 is a perspective view showing the outer appearance of the digital single-lens reflex camera 1120 according to this embodiment. FIG. 4 is a longitudinal sectional view of the digital single-lens reflex camera 1120 shown in FIG. 3.

Referring to FIG. 3, a camera body 100 has, at its upper portion, an eye-piece window 111 for viewfinder observation, an AE (Automatic Exposure) lock button 112, and a focus measurement point selection button 113 for AF (Automatic Focusing). The camera body 100 also has a release button 114 to input an instruction about shooting. The release button 114 allows input in two steps, i.e., half stroke (SW1) and full stroke (SW2). There are also an electronic dial 411 for selecting various set values, a shooting mode selection dial 117, and an external display device (OLC) 409. The external display device 409 is formed from a liquid crystal display device and displays shooting conditions such as a shutter speed, stop, and shooting mode or any other information.

The camera body 100 has, on its rear surface, the LCD monitor device 417 which displays a shot image, corrected image, or various kinds of setting screens such as a menu screen.

The camera body 100 also has, on its rear surface, a monitor switch 121 for turning on/off the LCD monitor device 417, the cross key switch 116, and a menu button 124.

The cross key switch 116 has four buttons arranged on the upper, lower, left, and right sides, and a SET button arranged at the center. A user uses the cross key switch 116 to instruct the camera to select or execute, e.g., a menu item displayed on the LCD monitor device 417.

The menu button 124 is used to display a menu screen to do various kinds of camera settings on the LCD monitor device 417. For example, a shooting mode is set by pressing the menu button 124, operating the upper, lower, left, and right buttons of the cross key switch 116, and pressing the SET button for a selected desired mode. The menu button 124 and the cross key switch 116 are also used for, e.g., settings in correcting dust in image data and printing it.

The LCD monitor device 417 of this embodiment is of transmission type, and the user cannot visually recognize an image only by driving the LCD monitor device. The LCD monitor device 417 always requires a backlight illumination device 416 on its rear side, as shown in FIG. 4. That is, the LCD monitor device 417 and the backlight illumination device 416 form an image display device.

As shown in FIG. 4, a taking lens 200 serving as an image capturing optical system is attachable to the camera body 100 via a lens mount 202. In FIG. 4, reference numeral 201 denotes a shooting optical axis; and 203, a quick return mirror.

The quick return mirror 203 is arranged in the shooting optical path to be movable between a position (the position shown in FIG. 4, which is called an inclined position) to guide object light from the taking lens 200 to the viewfinder optical system and a position (to be called a retreat position) to retreat from the shooting optical path.

In FIG. 4, object light guided from the quick return mirror 203 to the viewfinder optical system forms an image on a focusing screen 204. A condenser lens 205 improves the visibility of the viewfinder. A pentagonal roof prism 206 guides the object light that has passed through the focusing screen 204 and the condenser lens 205 to a photometry sensor 207 and an eye-piece lens 208 for viewfinder observation.

A rear curtain 209 and a front curtain 210 form a shutter. When the rear curtain 209 and front curtain 210 open, an image sensor 418 that is a solid-state image sensor arranged on the rear side to photoelectrically convert an object image is exposed to light for a necessary time. The shot image converted into an electrical signal for each pixel by the image sensor 418 undergoes processes by an A/D converter 423 and an image processing circuit 425 (both will be described later) and recorded in a recording medium 419 as image data. An optical low-pass filter 418a arranged in front of the image sensor 418 adjusts the special frequency of the object image to be formed on the image sensor 418. Dust (foreign substance) that affects the shot image sticks to the optical low-pass filter 418a and forms an image in the object image formed on the image sensor 418, thereby degrading the quality of the shot image.

A printed board 211 holds the image sensor 418. A display board 215 that is another printed board is arranged on the rear side of the printed board 211. The LCD monitor device 417 and the backlight illumination device 416 are arranged on the opposite surface of the display board 215.

The recording medium 419 records image data. Reference numeral 217 denotes a battery (portable power supply). The recording medium 419 and the battery 217 are detachable from the camera body.

Figure 5:
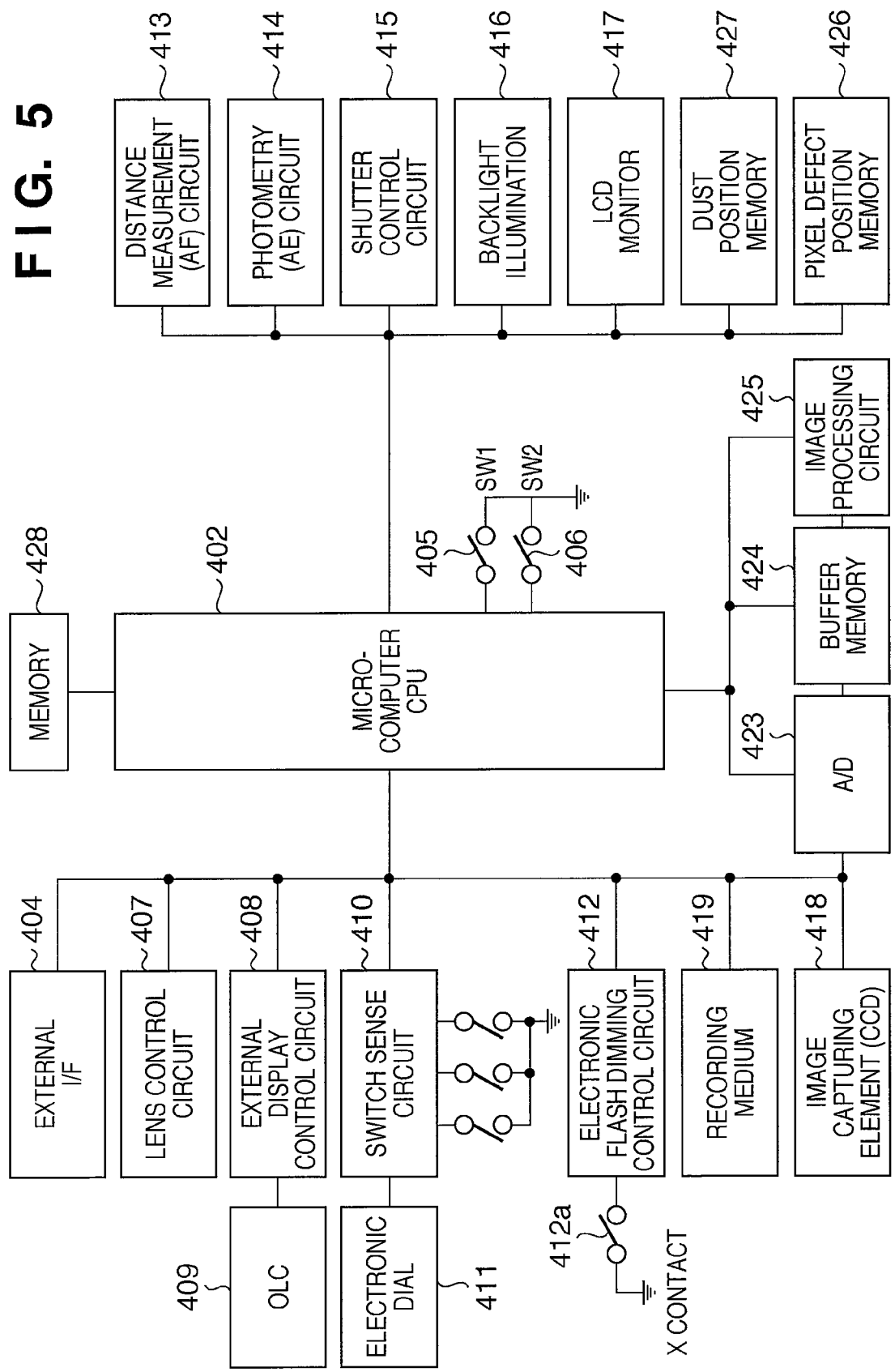
FIG. 5 is a block diagram showing the arrangement of the control system of the digital single-lens reflex camera.

FIG. 5 is a block diagram showing the circuit arrangement of the digital single-lens reflex camera 1120 according to the first embodiment of the present invention.

Referring to FIG. 5, a microcomputer 402 controls the overall operation of the camera by, e.g., processing image data output from the image sensor 418 or controlling display on the LCD monitor device 417.

When the user presses the release button 114 up to the half stroke position, a switch (SW1) 405 is turned on. When the switch (SW1) 405 is turned on, a pre-shooting state is set. When the user presses the release button 114 completely (full stroke state), a switch (SW2) 406 is turned on. When the switch (SW2) 406 is turned on, a shooting operation starts.

A lens control circuit 407 communicates with the taking lens 200 and controls driving of the taking lens 200 and diaphragm blades in the AF mode.

In FIG. 5, an external display control circuit 408 controls the external display device (OLC) 409 and the display device (not shown) in the viewfinder. A switch sense circuit 410 transmits the signals of a number of switches including the electronic dial 411 provided on the camera to the microcomputer 402.

An electronic flash dimming control circuit 412 is grounded via an X contact 412a and controls an external electronic flash. A distance measurement circuit 413 detects a defocus amount of the object for AF. A photometry circuit 414 measures the luminance of the object.

A shutter control circuit 415 controls the shutter to perform appropriate exposure of the image sensor 418. The LCD monitor device 417 and the backlight illumination device 416 form an image display device. The recording medium 419 is, e.g., a hard disk drive or a semiconductor memory detachable from the camera body.

The A/D converter 423, an image buffer memory 424, the image processing circuit 425 formed from a DSP or the like, and a pixel defect position memory 426 which stores data representing that a predetermined pixel itself in the image sensor has a defect are connected to the microcomputer 402. A dust position memory 427 which stores a pixel position in the image sensor where an image failure has occurred due to dust is also connected to the microcomputer 402. Note that nonvolatile memories are preferably used as the pixel defect position memory 426 and the dust position memory 427. The pixel defect position memory 426 and the dust position memory 427 may share a single memory space by storing data using different addresses.

A nonvolatile memory 428 stores programs to be executed by the microcomputer 402.

An external interface 404 including a USB interface (USB slave side) connects the digital camera to a PC or the printer 1110 of this embodiment.

SCSI and wireless TCP/IP are usable as the communication means between the digital single-lens reflex camera and the printer. A USB interface is used here.

Figure 6:
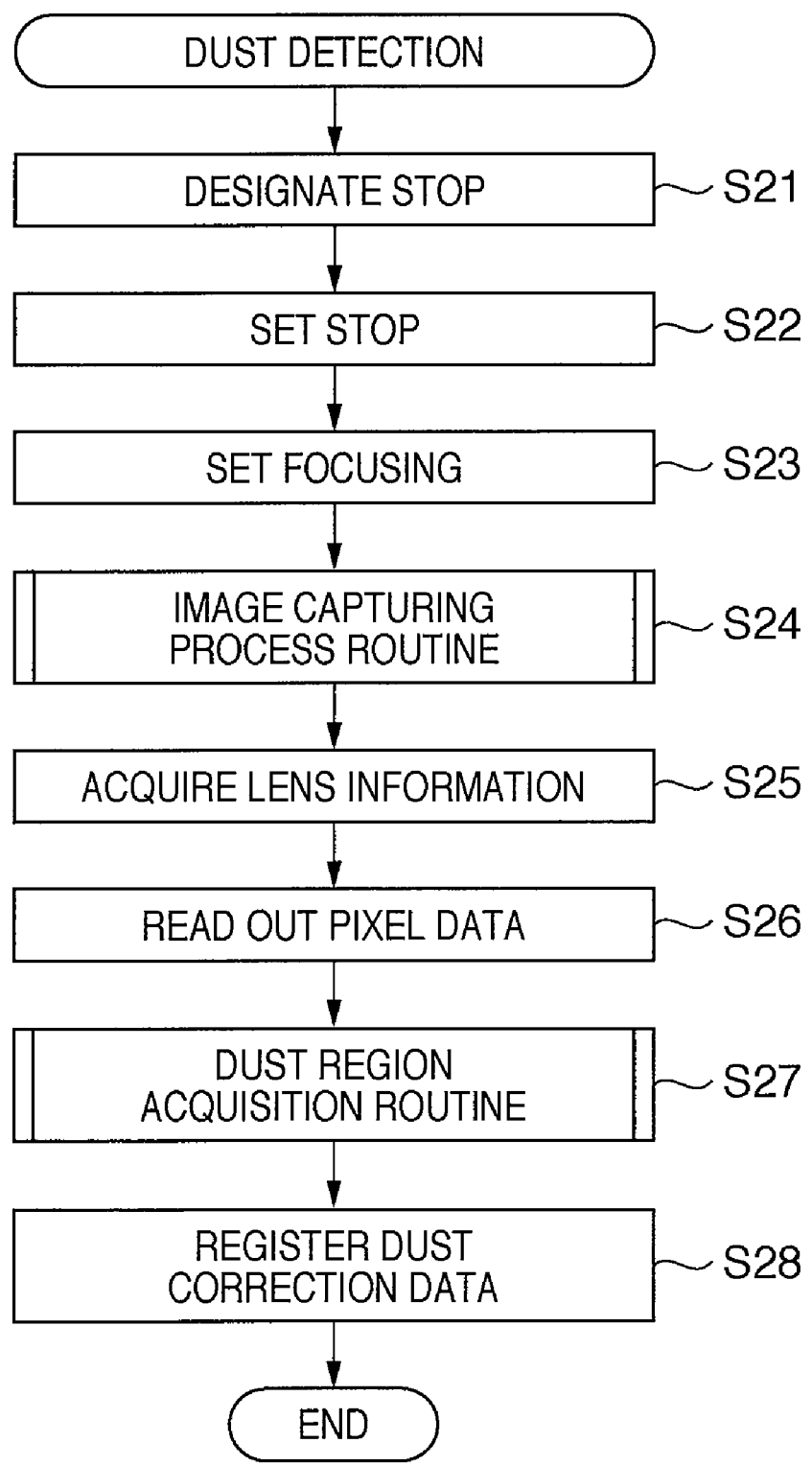
FIG. 6 is a flowchart for explaining the dust detection process of the digital camera.

An example of a process of detecting the position of dust sticking in the image capturing optical system will be described next with reference to the flowchart in FIG. 6.

The process is performed by causing the microcomputer 402 to execute a dust detection process program stored in the memory 428.

The dust detection process is executed by capturing an image for dust detection. To execute the dust detection process, the camera is set while directing the shooting optical axis 201 of the taking lens 200 to a plane having a solid color such as a white wall or the exit plane of a surface light source unit, thereby preparing for dust detection. Alternatively, a dust detection light unit (a compact point light source unit which is attached in place of a lens) is attached to the lens mount 202 to prepare for dust detection. An example of the light source of the light unit is a white LED. The size of the light-emitting surface is preferably adjusted in advance to a predetermined aperture value (e.g., F32).

In this embodiment, a case in which a normal taking lens is used will be described. However, dust detection may be done by attaching the above-described light unit to the lens mount 202. In this embodiment, the dust detection image is an image having a solid color, as described above.

After preparation, when the user instructs to start the dust detection process via the cross key switch 116, the microcomputer 402 sets the stop first. Dust near the image sensor changes its imaging state in accordance with the aperture value of the lens and its position depending on the pupil position of the lens. Hence, dust correction data must hold the aperture value and the lens pupil position upon detection, in addition to the position and size of each dust.

However, even when a different lens is used in creating dust correction data, the dust correction data need not always hold the aperture value if an aperture value to always be used is defined in advance. This also applies to the pupil position. That is, the dust correction data need not always hold the pupil position if a light unit is used, or use of only a specific lens is permitted.

That is, to permit use of a plurality of lenses or appropriately change the aperture value in creating dust correction data, the dust correction data needs to hold the aperture value and the lens pupil position upon detection. Note that the pupil position indicates the distance from the capturing plane (focal plane) of the exit pupil.

In this case, for example, F16 is designated (step S21).

The microcomputer 402 causes the lens control circuit 407 to control the diaphragm blades for the taking lens 200, thereby setting the stop to the aperture value designated in step S21 (step S22). The microcomputer 402 also sets the focus position to infinity (step S23).

When the aperture value and focus position of the taking lens are set, the microcomputer executes shooting in the dust detection mode (step S24). The image capturing process routine executed in step S24 will be described later with reference to FIG. 11. The shot image data is stored in the buffer memory 424.

When shooting is ended, the microcomputer 402 acquires the aperture value and the lens pupil position at the time of shooting (step S25). Data corresponding to each pixel of the shot image stored in the image buffer memory 424 is read out to the image processing circuit 425 (step S26). The image processing circuit 425 executes a process shown in FIG. 8 to acquire the position and size of each pixel region where dust exists in the image (step S27). The position and size of each pixel region where dust exists, which are acquired in step S27, and the aperture value and lens pupil position acquired in step S25 are registered in the dust position memory 427 (step S28). If the above-described light unit is used, no lens information can be acquired. If no lens information is acquired, the microcomputer determines that the light unit has been used and registers predetermined lens pupil position information and a converted aperture value calculated from the light source diameter of the light unit.

In step S28, the position of each defective pixel (pixel defect) which is recorded in the pixel defect position memory in advance at the time of manufacturing is compared with the position of each readout pixel data, thereby confirming whether the data indicates a pixel defect. The position of only a region that has been determined not to be a pixel defect may be registered in the dust position memory 427.

FIG. 7 shows an example of the data format of dust correction data stored in the dust position memory 427. As shown in FIG. 7, the dust correction data stores the lens information and the information of the position and size of dust upon shooting a detection image. The dust correction data is added to an image together with the shooting time information of the image data in a normal shooting mode.

More specifically, the actual aperture value and the lens pupil position upon shooting a detection image are stored as the lens information upon shooting the detection image. Next, the number of detected dust regions (integer value) is stored in the storage area. Next to this value, the specific parameters of each dust region are stored repeatedly as many as the dust regions. The parameters of a dust region include a set of three numerical values: the radius of dust (e.g., 2 bytes), the x-coordinate of the center of an effective image area (e.g., 2 bytes), and the y-coordinate of the center (e.g., 2 bytes).

If the size of dust correction data is limited due to, e.g., the capacity of the dust position memory 427, the data are stored preferentially in the order of dust regions obtained in step S27. This is because the dust regions are sorted in the order of remarkableness by the dust region acquisition routine in step S27, as will be described later.

The dust region acquisition routine executed in step S27 will be described next with reference to the FIGS. 8 to 10.

Figure 9:
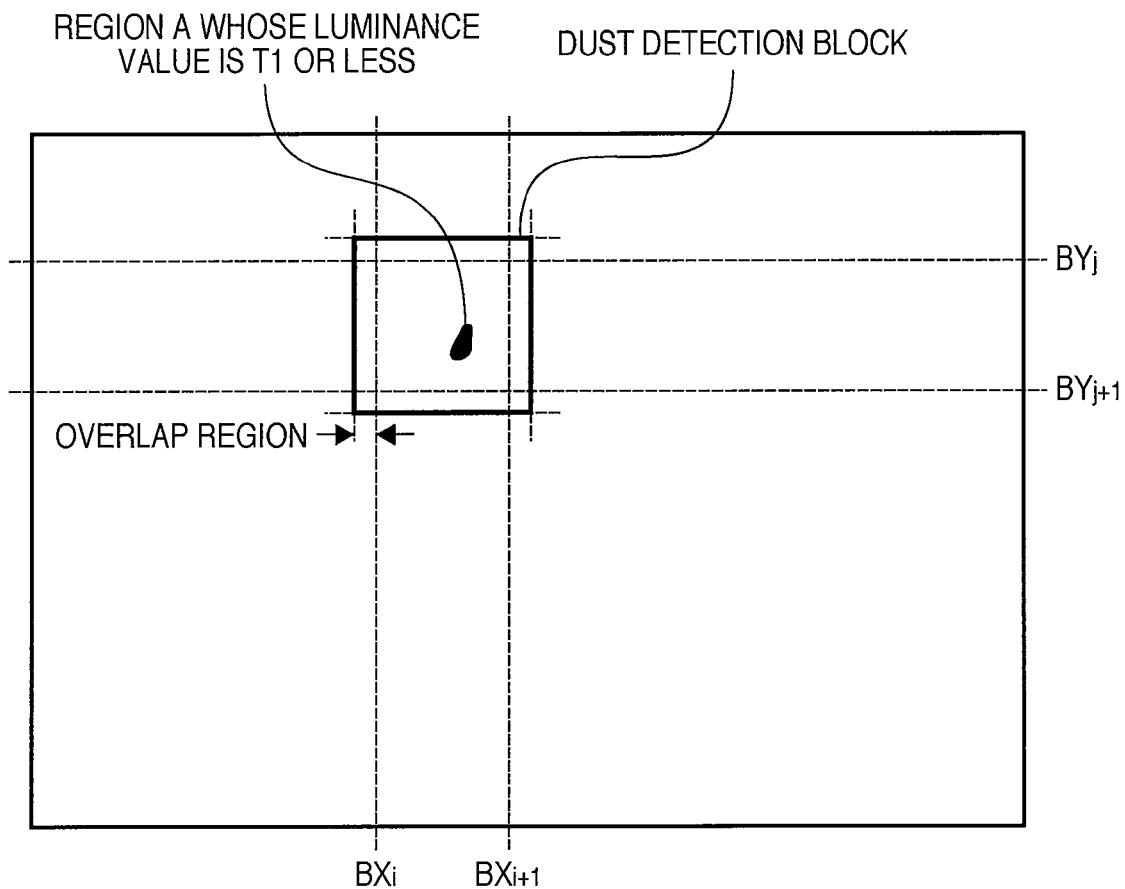
FIG. 9 is a view showing the process unit of a dust region determination process executed in step S62 in FIG. 8.

As shown in FIG. 9, invoked image data is rasterized on the memory and processed in each predetermined block. This aims at coping with vignetting caused by the lens or sensor characteristic. Vignetting is a phenomenon that the luminance at the peripheral portion of a lens becomes lower than that at the central portion. As is known, the vignetting can be suppressed to some extent by increasing the aperture value of the lens. Even in the stopped-down-aperture state, however, if dust position determination is done using a predetermined threshold value for the shot image, it may be impossible to accurately detect dust at the peripheral portion depending on the lens. To prevent this, the image is segmented into blocks, thereby reducing the influence of vignetting.

Simple block segmentation causes a shift in the dust detection result between the blocks if the threshold value changes between the blocks. To prevent this, the blocks are made to overlap. A pixel determined to be dust in any one of the blocks included in the overlap region is handled as a dust region.

Figure 8:
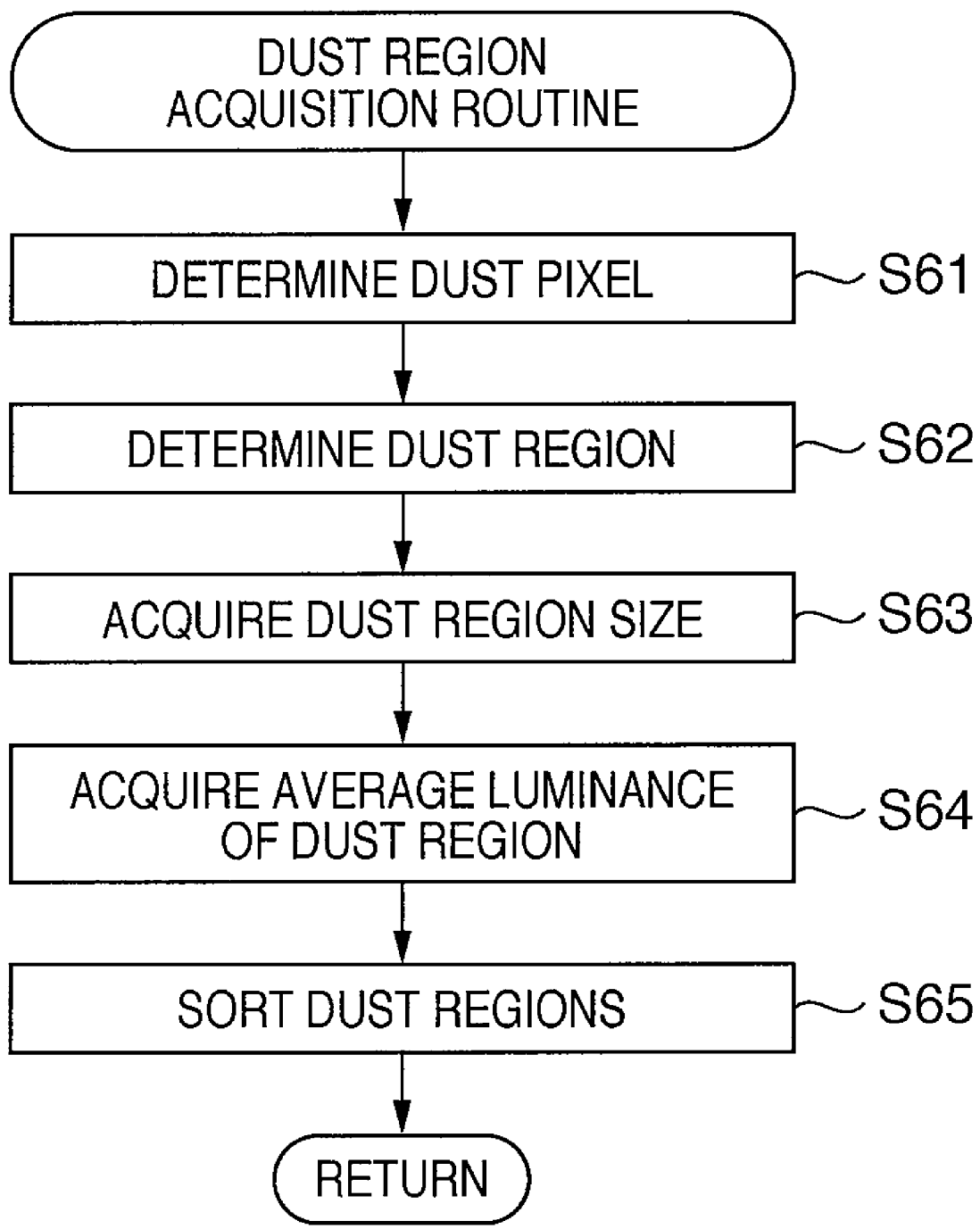
FIG. 8 is a flowchart for explaining details of a dust region acquisition routine executed in step S27 in FIG. 6.

Dust region determination in a block is done in accordance with the process sequence shown in FIG. 8. First, a maximum luminance Lmax and an average luminance Lave in a block are calculated. A threshold value T1 in the block is calculated by $$T1 = Lave \times 0.6 + Lmax \times 0.4$$

Next, each pixel less than the threshold value is determined to be a dust pixel (step S61). Each isolated region formed from dust pixels is defined as a dust region di (i=0, 1, ..., n) (step S62). As shown in FIG. 10, a maximum value Xmax and a minimum value Xmin of the horizontal coordinates and a maximum value Ymax and a minimum value Ymin of the vertical coordinates of pixels included in each dust region are obtained. A radius ri representing the size of the dust region is calculated by $$ri = \sqrt{[\{(Xmax-Xmin)/2\}^2 + \{(Ymax-Ymin)/2\}^2]}$$

(step S63).

Figure 10:
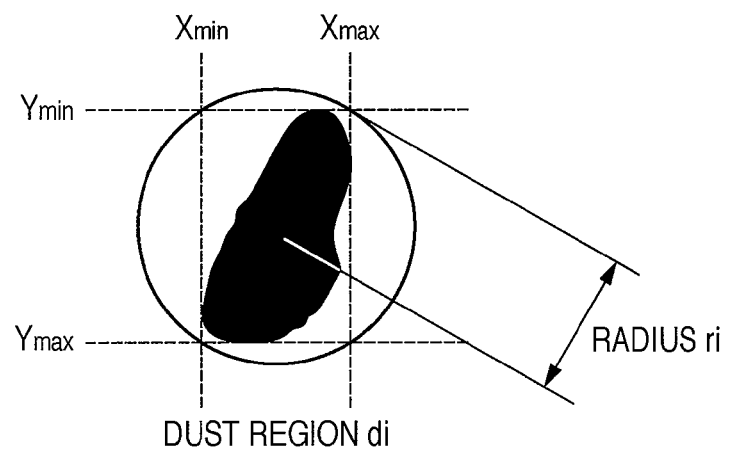
FIG. 10 is a view showing the outline of dust region size calculation executed in step S63 in FIG. 8.

FIG. 10 shows the relationship between ri and Xmax, Xmin, Ymax, and Ymin.

In step S64, the average luminance value of each dust region is calculated.

The size of dust correction data is sometimes limited due to, e.g., the capacity of the dust position memory 427. To cope with such a case, the pieces of dust position information are sorted on the basis of the sizes or average luminance values of the dust regions (step S65). In this embodiment, sorting is performed in ascending order of ri. Dust regions whose ri are identical are sorted in descending order of average luminance value. This makes it possible to preferentially register noticeable dust in the dust correction data. Note that a sorted dust region is represented by Di, and the radius of the dust region Di is represented by Ri.

If a dust region is larger than a predetermined size, the dust region may be excluded from the sorting target and arranged at the end of the sorted dust region list. This is because a large dust region may degrade the image quality upon interpolation to be executed later and is preferably handled as a region with the lowest priority order in the correction target.

Figure 11:
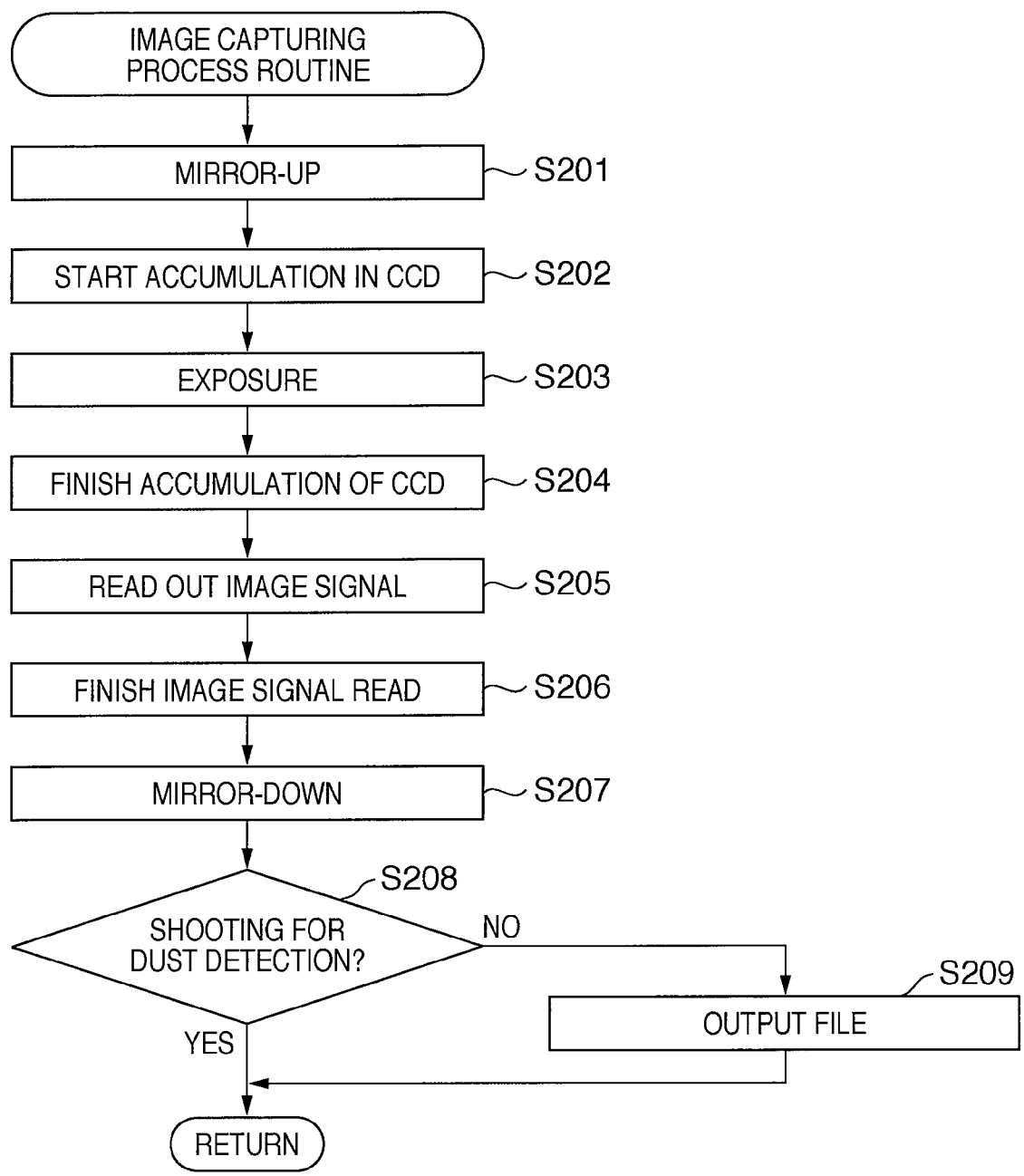
FIG. 11 is a flowchart for explaining details of an image capturing process routine executed in step S24 in FIG. 6.

Details of the image capturing process routine executed in step S24 in FIG. 6 will be described next with reference to the flowchart in FIG. 11. The process is performed by causing the microcomputer 402 to execute an image capturing process program stored in the memory 428.

When the image capturing process routine is executed, the microcomputer 402 actuates the quick return mirror 203 shown in FIG. 4 in step S201 so that the quick return mirror 203 causes so-called mirror-up and retreats outside the shooting optical path.

In step S202, the image sensor starts accumulating charges. In step S203, the front curtain 210 and rear curtain 209 of the shutter shown in FIG. 4 are made to travel to perform exposure. In step S204, charge accumulation of the image sensor finishes. In step S205, an image signal is read out from the image sensor, and the image data that has undergone the processes of the A/D converter 423 and the image processing circuit 425 is temporarily stored in the buffer memory 424.

In step S206, readout of all image signals from the image sensor is ended. In step S207, the quick return mirror 203 causes mirror-down and returns to the inclined position. The series of image capturing operations is thus ended.

In step S208, the microcomputer determines whether the mode is normal shooting or dust detection image shooting. In normal shooting, the process advances to step S209 to write the dust correction data shown in FIG. 7 in an Exif area that is the header field of the image data together with the camera set value and the like upon shooting, and record the data in the recording medium 419 in association with the image data.

In the following embodiment, a description will be made using an image file which integrally holds dust correction data and image data. The embodiment is also applicable even when the dust correction data and image data are recorded not integrally but as, e.g., separated files associated with each other.

EXAMPLE 1

Figure 12:
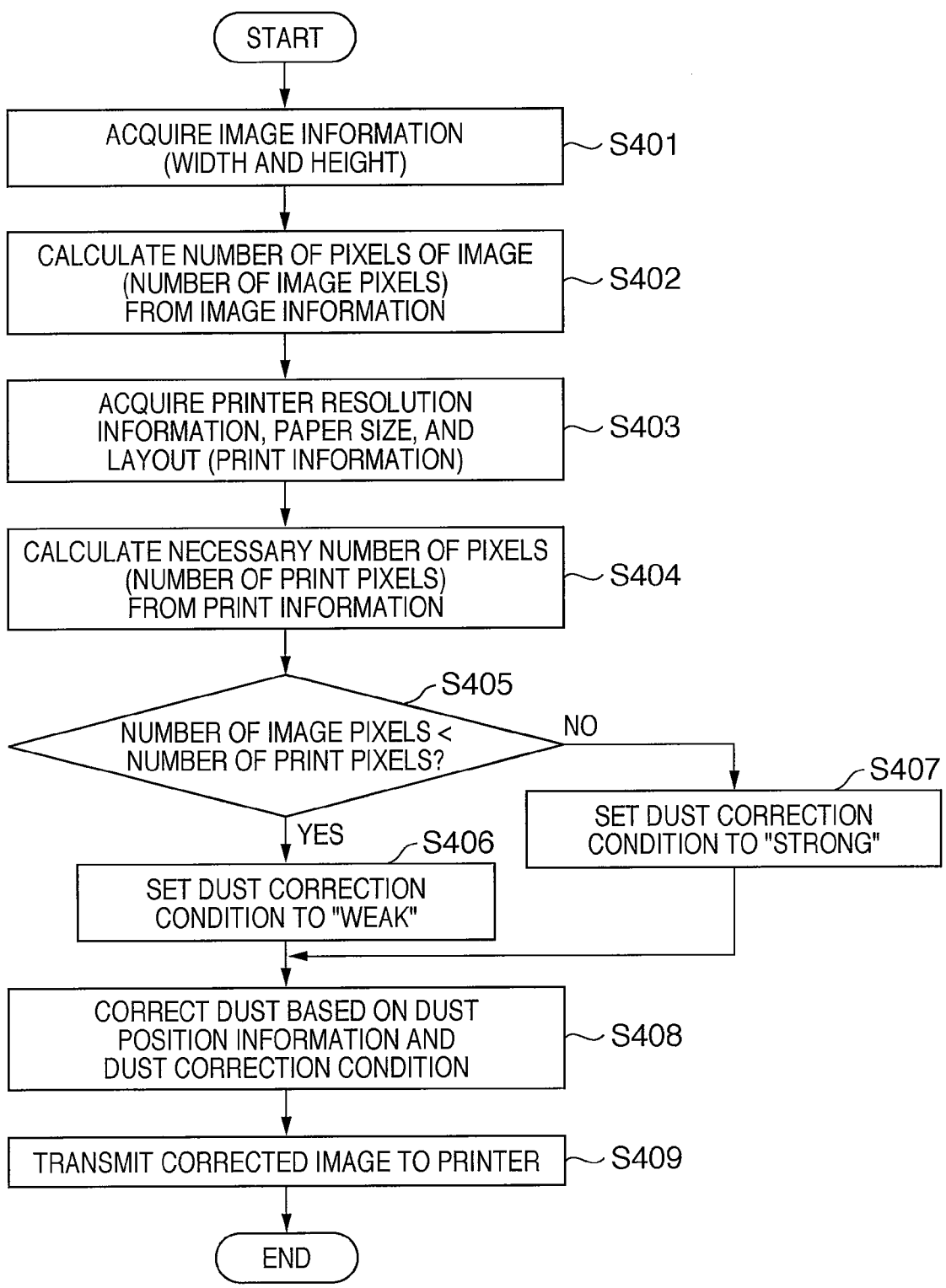
FIG. 12 is a flowchart illustrating a process of correcting dust and outputting the image to the printer according to Example 1 of the embodiment of the present invention.

FIG. 12 is a flowchart illustrating a process of correcting dust in image data and printing it. FIG. 12 shows the process procedure in the camera after the user has done settings for printing using the LCD monitor device 417 and the cross key switch 116. Note that all necessary data such as the pieces of set information, the image data of a selected image, and dust correction data associated with it are decompressed and rasterized, as needed, and stored in the memory 428.

In step S401, the number of pixels corresponding to each of the width and height of an image that is selected (to be referred to as a selected image hereinafter) are read out from the memory 428. These pieces of information can directly be calculated from the decompressed image. Alternatively, they are described in the Exif (Exchangeable Image File Format) information of the image and can therefore be acquired from there. In step S402, the microcomputer calculates the number of pixels of the image (to be referred to as the number of image pixels hereinafter) on the basis of the number of pixels in the widthwise direction and that in the height direction of the image acquired in step S401. For example, when the selected image contains 3888 pixels×2592 pixels, the number of image pixels is about 10,000,000. In this case, the microcomputer 402 serves as an image pixel count acquisition means.

In step S403, the microcomputer reads out, from the memory 428, the output resolution information, paper size, and layout of the printer (the three pieces of information will collectively be referred to as printer information hereinafter). The printer output resolution information can be acquired as the contents described in a parameter "qualities" of a Capability command of the PictBridge standard or by preparing a communication method of individually inquiring of the printer about the resolution. Alternatively, a plurality of pieces of output printer information may be stored in the memory 428 in advance, and the user may select one of them using the LCD monitor device 417 and the cross key switch (SW) 116. For example, the user selects the model name of a printer to be used for output from a menu displayed on the LCD monitor device 417. The microcomputer 402 reads out information about the selected printer from the memory 428 and acquires the output resolution information of the printer.

Set items related to printing to be preset by the user will be described.

Figure 14:
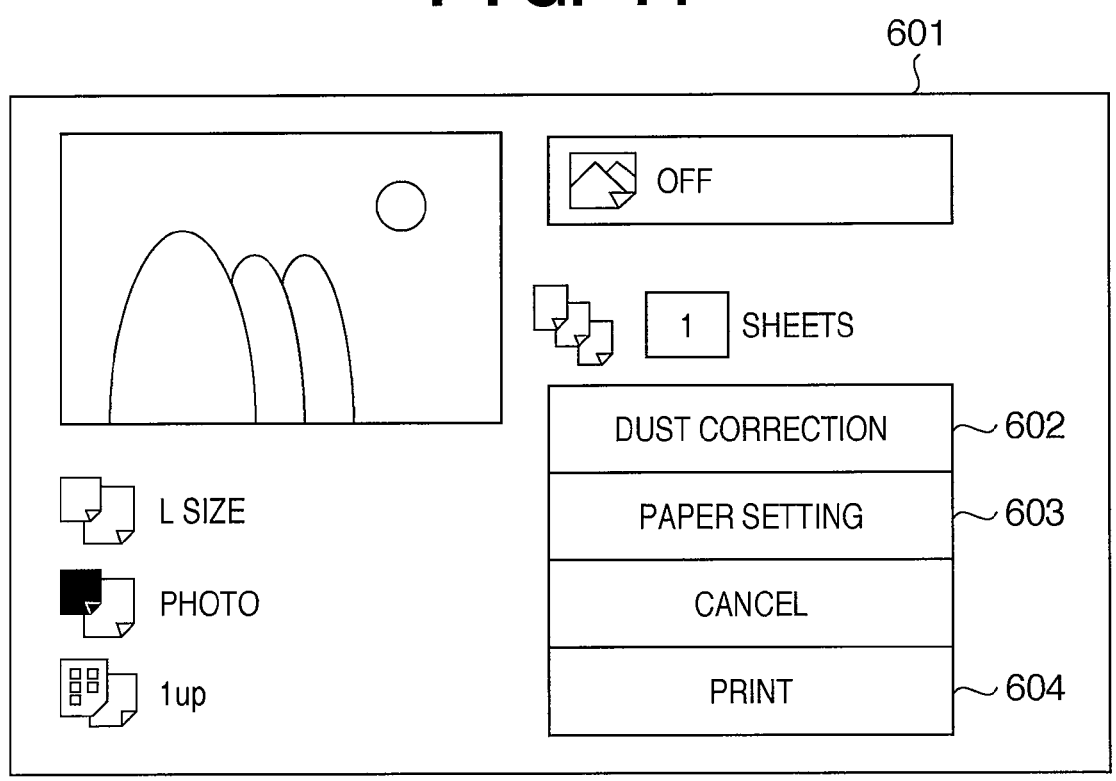
FIG. 14 is a view showing a print setting screen displayed on an LCD monitor device 417.

FIG. 14 shows a print setting screen that is displayed as a menu on the LCD monitor device 417. As shown in FIG. 14, a print setting screen 601 includes a shot image as a setting target, the number of paper sheets to be printed, various kinds of set items, and icons. A "dust correction" button 602 is used to select whether to execute the dust correction process. A "paper setting" button 603 is used to do settings about printing paper. More specifically, when the user presses the "paper setting" button 603, transition to a paper size setting screen occurs.

FIG. 15 is a view showing a paper size selection screen that is displayed as a menu on the LCD monitor device 417. As shown in FIG. 15, the menu is displayed to allow the user to select L size, 2L size, postcard size, A4 size, or the like in accordance with the paper size to be printed. The user can select a desired item using the cross key switch (SW) 116, as in selection of other menu items.

When the user selects a paper size, transition to a paper type selection screen occurs. FIG. 16 is a view showing a paper type selection screen that is displayed as a menu on the LCD monitor device 417. More specifically, the user can select "Photo" quality paper with priority to the image quality, general "FastPhoto" quality paper, and "Default" as a default value.

When the user selects a paper type, transition to a layout selection screen occurs. FIG. 17 is a view showing a layout selection screen that is displayed as a menu on the LCD monitor device 417. More specifically, the user can select "1-Up Borderless" to borderlessly print an image all over a paper sheet, "1-Up" to print an image with a border, "2-Up" to divide a paper sheet into two parts and lay out two identical photo images, and the like.

Referring back to FIG. 12, in step S403, the microcomputer acquires the paper size and layout information selected by the user in the above-described manner, in addition to the printer output resolution information, and collects information about the resolution of the image to be printed. In print output, the microcomputer 402 which acquires information about the resolution of the image to be output serves as an output resolution acquisition means.

Figure 13:
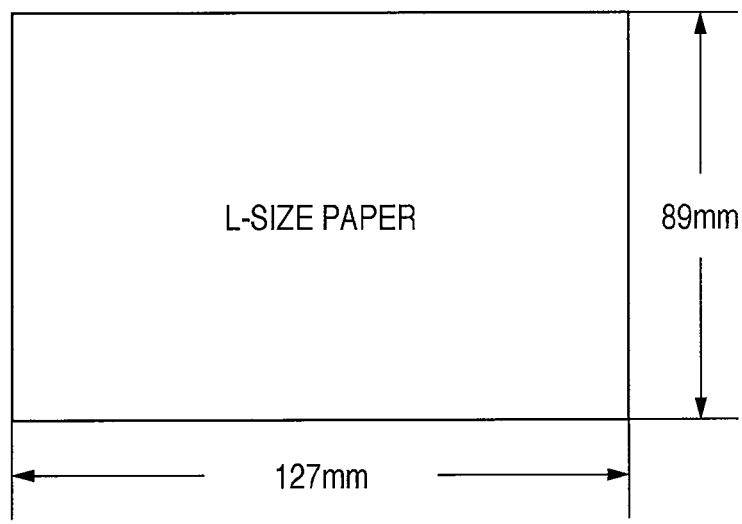
FIG. 13 is a view for explaining L-size paper output by the printer.

In step S404, the microcomputer calculates the number of pixels necessary for printing (to be referred to as the number of print pixels hereinafter) on the basis of the information about the resolution of the image to be output. For example, when the paper size is L (89 mm×127 mm) shown in FIG. 13, the layout is 1-Up, and the printer resolution is 600 dpi, the number of print pixels is calculated in the following way.

First, since 1 in.=2.54 cm, the paper size is 89 mm=3.5 in. in the vertical direction and 127 mm=5 in. in the horizontal direction. Since the printer resolution is 600 dpi, L-size printing requires 3.5×600=2100 dots in the vertical direction and 5×600=3000 dots in the horizontal direction. Hence, the number of dots necessary for L-size printing is vertical dot count× horizontal dot count=6,300,000 dots. Since the layout is 1-Up, the number of pixels necessary for L-size printing is 6,300,000/1=6,300,000 pixels. If the layout is 2-Up, 6,300,000/2=3,150,000 pixels. Instead of calculating the number of print pixels in the camera, the designated paper size and layout information may be transmitted to the printer so that the printer calculates the number of print pixels and returns it to the camera.

In step S405, the number of image pixels calculated in step S402 is compared with the number of print pixels calculated in step S404. In step S406 or S407, the microcomputer decides the dust (foreign substance) correction level (the degree of foreign substance correction). In this case, the microcomputer 402 serves as a foreign substance correction level setting means for setting the foreign substance correction level.

For example, if the number of image pixels is equal to or smaller than the number of print pixels, the selected image is printed in a normal size or an enlarged size. For this reason, when a large dust particle is corrected, smearing occurs in the corrected portion, resulting in a sense of incongruity between the dust and objects around it. This only makes the corrected portion noticeable in the enlarged image. To prevent this, the dust correction condition is set to "weak" to correct only dust particles on a solid-color object such as sky and not to correct dust particles in regions where a sense of incongruity can readily occur upon correction. Conversely, if the number of image pixels is larger than the number of print pixels, the selected image is printed in a reduced size. For this reason, even when correction causes smearing and a sense of incongruity, the influence on the periphery of dust is suppressed by reducing the image size. In this case, the dust correction condition is set to "strong".

In step S408, the microcomputer corrects the selected image based on the dust correction condition decided in step S406 or S407. For example, if the correction condition is "weak", the microcomputer executes a process of correcting only dust particles in solid-color regions such as sky or inhibiting correction of large dust particles. If the correction condition is "strong", the microcomputer executes a process of correcting even large dust particles or dust particles whose peripheral portions have no solid color. The correction is done using a known method of, e.g., executing interpolation using pixels around dust. Finally, in step S409, corrected image data obtained by correcting dust is output to the printer on the basis of the PictBridge standard.

It is consequently possible to execute a high-quality dust correction process at maximum under the user-designated paper size and layout conditions in direct printing. In this embodiment, the dust correction condition is decided using the paper size and layout information designated by the user. The paper type information may also be used to decide the dust correction condition. The dust correction condition is set to two levels "weak" and "strong". However, the number of levels is not limited to two.

EXAMPLE 2

In Example 2, a method of causing the user to turn "ON/OFF" the dust correction process or set the correction amount level (e.g., weak/medium/strong) (to be referred to as a user correction level hereinafter), in addition to the process of Example 1, will be described.

Figure 18:
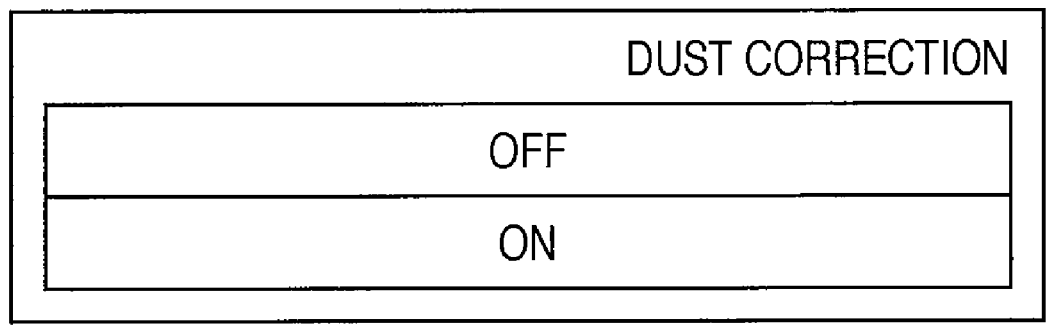
FIG. 18 is a view showing a screen displayed on the LCD monitor device 417 to designate whether to execute the dust correction process.
Figure 19:
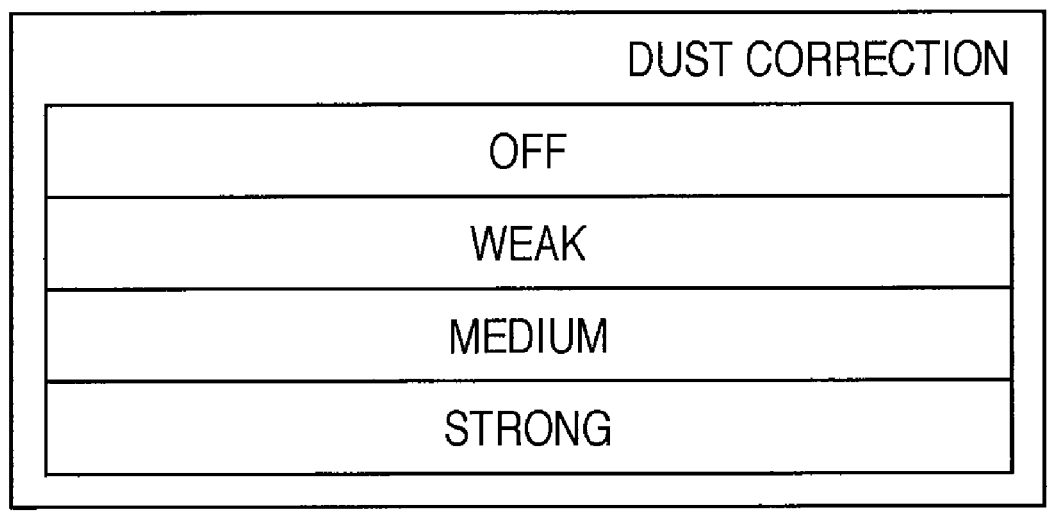
FIG. 19 is a view showing a screen displayed on the LCD monitor device 417 to cause a user to select a correction amount.

As in Example 1, first, the user selects an image to be printed and sets the paper size, paper type, and layout in the print setting screen in FIG. 14 and the screens in FIGS. 15 to 17 to which transition occurs from the print setting screen. The pieces of set information are stored in the memory 428. In Example 2, the user presses the "dust correction" button 602 in the print setting screen 601 to cause transition to a screen for selecting "ON/OFF" of the dust correction process. More specifically, transition to a screen in FIG. 18 occurs so that the user can select "OFF" and "ON" of dust correction in the menu displayed on the LCD monitor device 417. When the user selects "OFF" or "ON" of dust correction, transition to a screen for selecting a user correction level occurs. More specifically, transition to a screen in FIG. 19 occurs so that the user can select the user correction level from "weak", "medium", and "strong" in the menu displayed on the LCD monitor device 417. However, when the user has selected "OFF" of dust correction, "OFF" is automatically selected in the user correction level menu screen. These pieces of set information are also stored in the memory 428. When the user presses a "print" button 604 in the print setting screen 601 in FIG. 14, the dust correction process is executed, and corrected image data is output to the printer. Note that the screen shown in FIG. 19 serves as a user correction level setting means.

Figure 20:
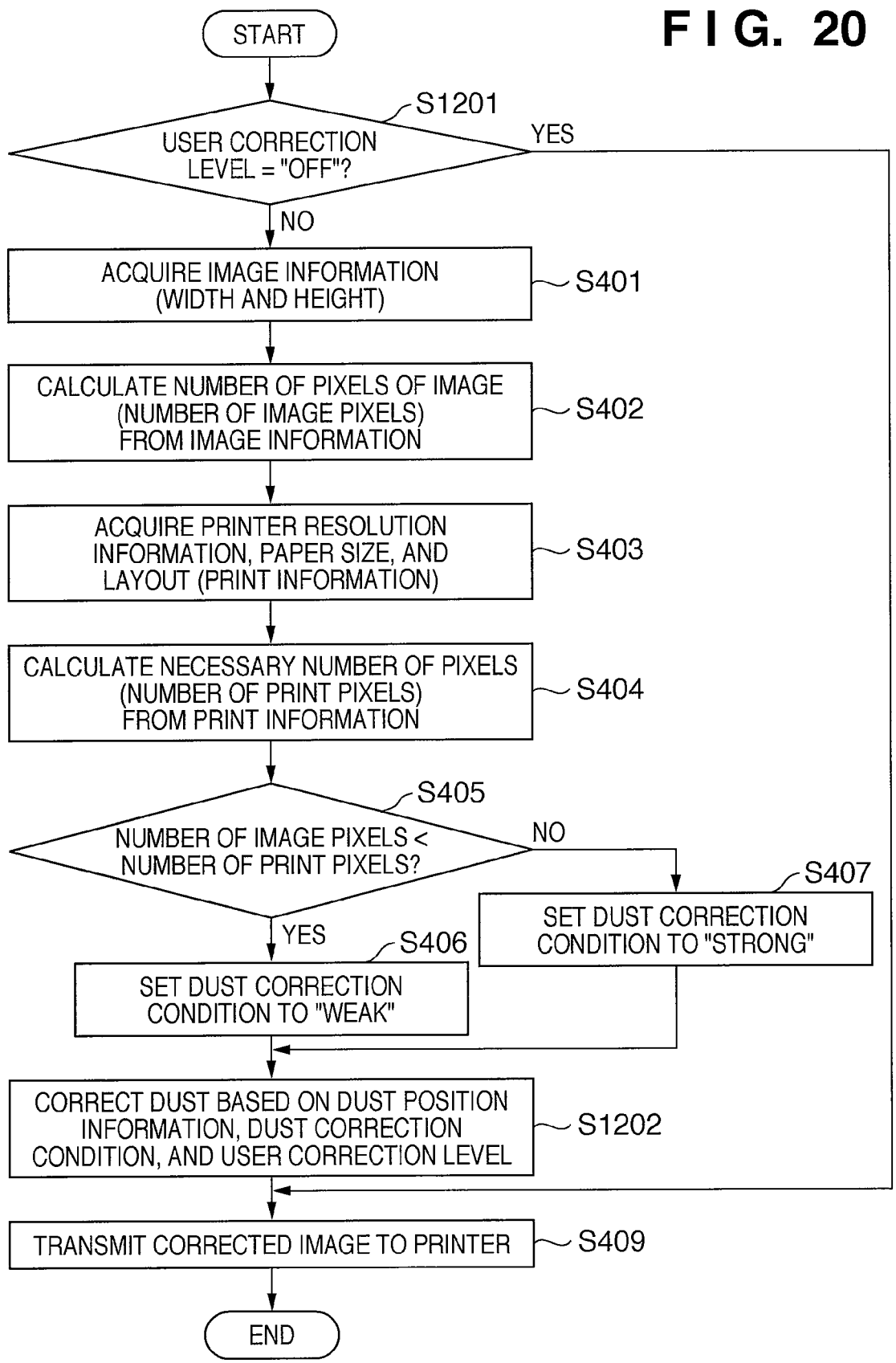
FIG. 20 is a flowchart illustrating an operation of correcting dust and outputting the image to the printer according to Example 2 of the embodiment of the present invention.

FIG. 20 is a flowchart illustrating an operation of correcting dust and printing an image according to Example 2. Only processes different from FIG. 12 will be described.

In step S1201, the microcomputer refers to the user correction level stored in the memory 428. If the user correction level is "OFF", the process advances to step S409. Otherwise, the process advances to step S401. When the process advances to step S401, the same processes as in Example 1 are executed in steps S401 to S406 or S407.

In step S1202, the microcomputer refers to the dust correction data, dust correction condition, and user correction level in the memory 428, decides the degree of dust correction on the basis of the dust correction condition and the user correction level, and corrects dust in each location indicated by the dust correction data.

FIG. 21 shows a dust correction table as an example of the method of deciding the degree of dust correction on the basis of the dust correction condition and the user correction level. In the dust correction table, for example, when the dust correction condition is "weak", and the user correction level is "strong", the user's intention is respected because the user correction level is "strong" although the dust correction condition is "weak". That is, the dust correction level is "strong", and large dust particles or dust particles whose peripheral portions have no solid color are also corrected. When the dust correction condition is "strong", and the user correction level is "strong", the dust correction level is "strong strong", and all regions recognized as dust particles are corrected. The process of correcting dust is executed in accordance with the decided dust correction level. In step S409, the corrected image is output to the printer and printed. In this way, five levels from "OFF" to "strong strong" are assigned in accordance with the combinations of the user correction level and the dust correction condition.

As a result, when the user designates "ON/OFF of correction" or the correction level (weak/medium/strong) in dust correction, it is possible to better reflect the user's intention on the correction process and acquire a print result desired by the user.

EXAMPLE 3

In Example 3, a method of notifying the user which dust particle on an image should be corrected and which should not be corrected on the basis of the decided dust correction level before printing, in addition to the processes of Examples 1 and 2, will be described.

As in Example 1 or 2, first, the user selects an image to be printed and sets the paper size, paper type, layout, and user correction level in the print setting screen in FIG. 14. All necessary data such as the pieces of set information, the image data of the selected image, and dust correction data associated with it are decompressed and rasterized, as needed, and stored in the memory 428. When the user presses the "print" button 604 in the print setting screen 601 in FIG. 14, the dust correction process is executed, and corrected image data is output to the printer.

Figure 22:
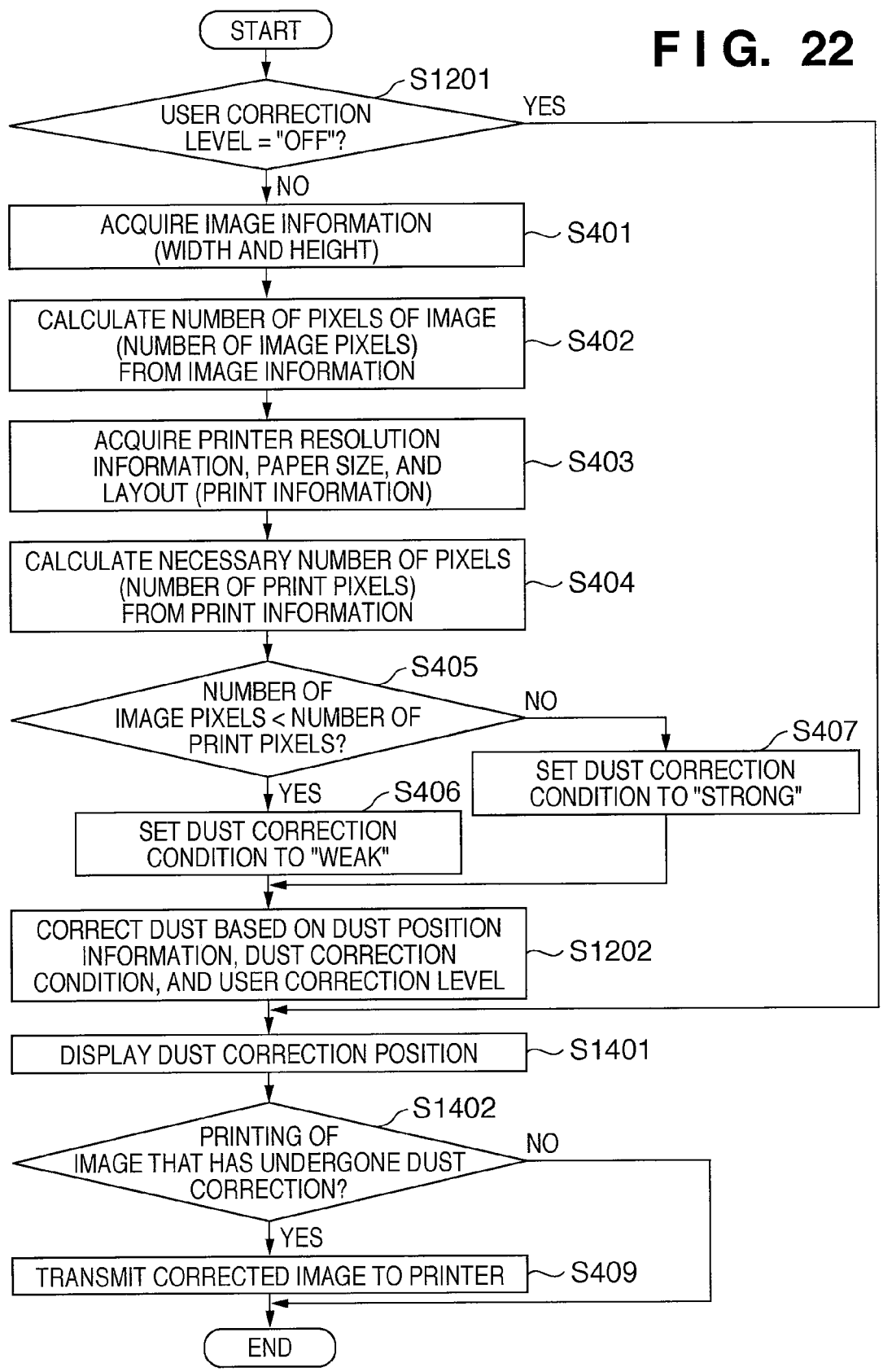
FIG. 22 is a flowchart illustrating a process of correcting dust and outputting the image to the printer according to Example 3 of the embodiment of the present invention.

FIG. 22 is a flowchart illustrating an operation of correcting dust and printing an image according to Example 3. Only processes different from FIG. 20 will be described.

Figure 23:
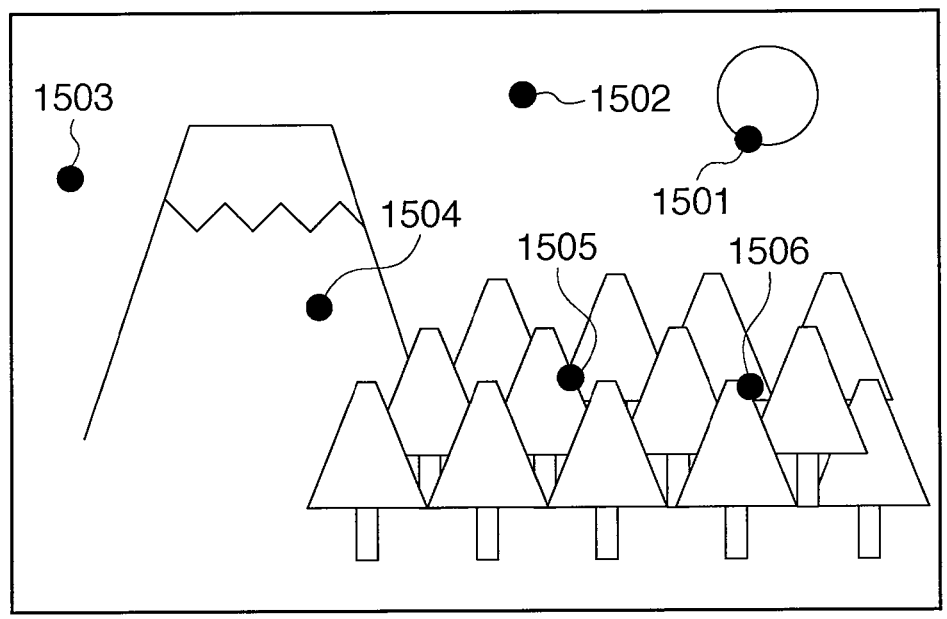
FIG. 23 is a view showing an example of a shot image containing dust.

Up to step S1202, a dust correction process for a selected image is executed, as in the steps in FIG. 20 described in Example 2. Assume that an image shown in FIG. 23 is selected and to be output to a printer having a resolution of 600 dpi. The paper size is "L", the layout is "1-Up", and the user correction level is set to "weak". In this case, the correction level is "medium" based on the dust correction table in FIG. 21. The dust correction process is executed for the image in FIG. 23 at this correction level. Reference numerals 1501 to 1506 denote images of dust particles sticking to the optical low-pass filter 418a (in this embodiment, an image itself in the shot image is sometimes called "dust"). Dust correction data holds the position information of each dust image in the shot image. These dust images are correction target candidates.

Figure 24:
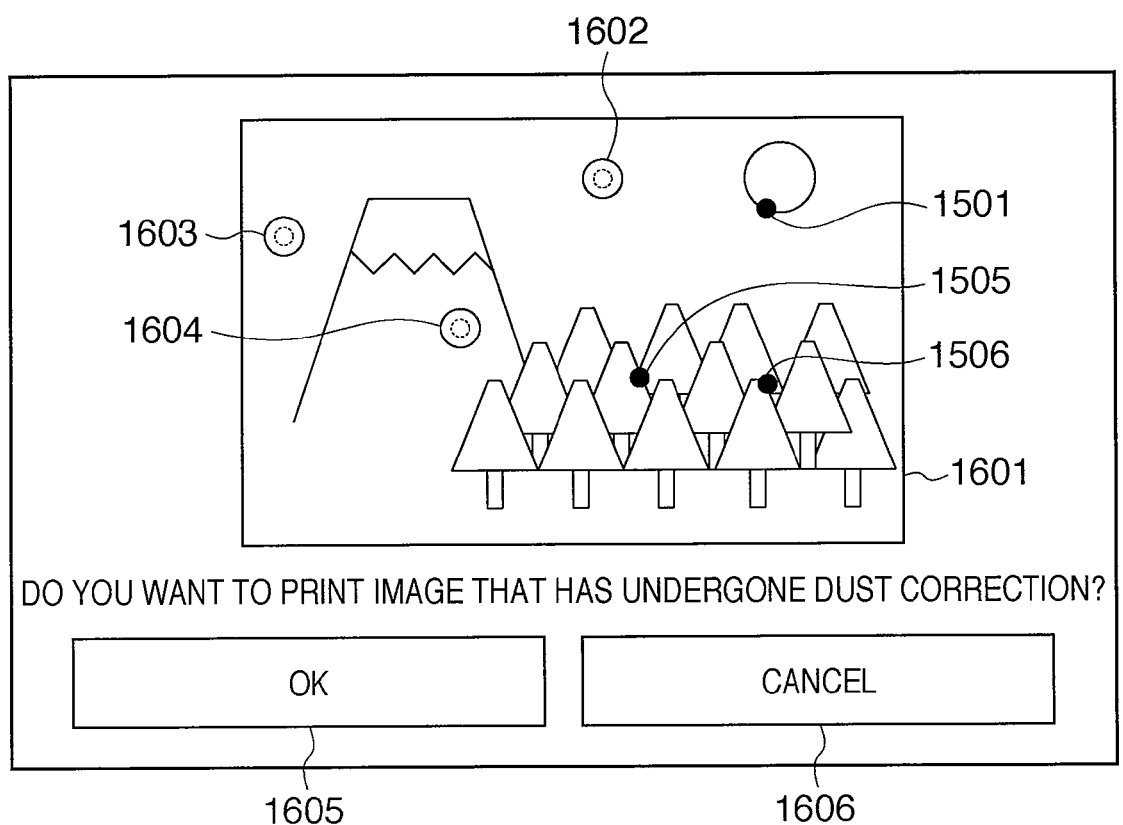
FIG. 24 is a view showing a print output selection screen displayed on the LCD monitor device 417.

In step S1401, the LCD monitor device 417 displays the corrected image in the following way, as shown in FIG. 24. The LCD monitor device 417 displays an image 1601 in which, of the dust particles 1501 to 1506 in FIG. 23, positions of dust particles 1602 to 1604 to be corrected at the correction level "medium" are indicated by ○.

In step S1402, the user views the image 1601 displayed as in FIG. 24. To print the image that has undergone the dust correction process, the user presses an OK button 1605 to output the image to the printer and print it. If the user does not want to print the image that has undergone the dust correction process, he/she presses a cancel button 1606.

As a consequence, the user can confirm before printing which dust particle should be corrected, as shown in FIG. 24 and, upon determining that the correction is insufficient or excessive, set the user correction level again without printing. This prevents waste of paper and allows the user to obtain a desired print result.

In Example 3, the position of a dust particle to be corrected is indicated by ○ to notify the user of it. However, any other display method such as blinking is also usable if it can make the user easily recognize a dust position.

In Examples 1 to 3 of the embodiment, the printer output resolution and the paper size and layout information selected by the user are acquired as the information about the resolution of the image to be printed. The number of pixels of the shot image and the number of pixels (dots) to be output to the printer are calculated on the basis of these pieces of information and compared. However, the information about the resolution of the image to be printed need not always include all the pieces of information. For example, only the paper size selected by the user may be acquired as the information about the resolution of the image to be printed, and a foreign substance correction level table having a matrix of the paper size and the number of pixels of the shot image may be prepared. At this time, an item set in correspondence with the shot image size such as "L" or "S" set by the user upon shooting, i.e., the number of shooting pixels may be handled as the number of pixels of the shot image. In this case, the image pixel count acquisition means actually acquires the size of the shot image.

OTHER EMBODIMENTS

In the above-described embodiment, a lens interchangeable digital single-lens reflex camera is connected to a printer, as shown in FIG. 1. However, the present invention is not limited to this. A lens interchangeable digital single-lens reflex camera may include an integrated printer unit. Alternatively, an apparatus dedicated to image processing, which receives an image shot by the digital single-lens reflex camera via a communication means such as wireless communication and executes foreign substance correction, may be connected to the printer serving as an output device. At this time, the apparatus dedicated to image processing may include an integrated printer.

The present invention may be achieved by supplying a software program (in the embodiment, a program corresponding to the communication procedure shown in the drawings) for implementing the functions of the above-described embodiment to each apparatus directly or from a remote site. The present invention incorporates a case in which the processing unit of the apparatus reads out and executes the supplied program codes to implement the above-described embodiment.

Hence, the program codes themselves which are installed in a computer to cause the computer to implement the functional processing of the present invention also implement the present invention. That is, the present invention also incorporates the computer program itself to implement its functional processing.

In this case, the program can take any form such as an object code, a program to be executed by an interpreter, or script data to be supplied to the OS as long as the functions of the program are available.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-149641, filed Jun. 5, 2007, which is hereby incorporated by reference herein in its entirety.

What is claimed is:

1. An image processing apparatus which corrects image data containing an image of a foreign substance by removing the image of the foreign substance, the foreign substance adhering to an optical element arranged in front of an image sensor for photoelectrically converting an object image, and outputs corrected image data as a visible image, comprising:

an image pixel count acquisition unit adapted to acquire the number of pixels of the image of the image data;

an output resolution acquisition unit adapted to acquire information about a resolution of the image to be output to the output device;

a foreign substance correction unit adapted to correct the image of the foreign substance contained in the image data; and a control unit adapted to control a correction operation of the foreign substance correction unit on the basis of at least the number of pixels acquired by the image pixel count acquisition unit and the information about the resolution acquired by the output resolution acquisition unit;

wherein the control unit controls the foreign substance correction unit so that a number of images of the foreign substances, which are corrected when the number of image pixels is larger than the number of output pixels, is larger than a number of images of the foreign substances which are corrected when the number of image pixels is equal to or smaller than the number of output pixels.

2. The apparatus according to claim 1, wherein the output device is a printer, and the information about the resolution is a printing paper size which is set by the user in the image processing apparatus as a size of a printing paper sheet to be output from the printer.

3. The apparatus according to claim 1, wherein the foreign substance correction unit executes correction based on at least position information of the image of the foreign substance contained in the image of the image data, the position information being recorded in association with the image data.

4. The apparatus according to claim 1, further comprising a display unit adapted to display the corrected image data corrected by the foreign substance correction unit and a position of correction.

5. A method of controlling an image processing apparatus which corrects image data containing an image of a foreign substance by removing the image of the foreign substance, the foreign substance adhering to an optical element arranged in front of an image sensor for photoelectrically converting an object image, and outputs corrected image data as a visible image, comprising the steps of:

acquiring the number of pixels of the image of the image data;

acquiring information about a resolution of the image to be output to the output device; and correcting the image of the foreign substance contained in the image data so that a number of images of the foreign substances, which are corrected when the number of image pixels is larger than the number of output pixels, is larger than a number of images of the foreign substances which are corrected when the number of image pixels is equal to or smaller than the number of output pixels.

6. A non-transitory computer-readable storage medium storing a program causing a computer to execute a control method of claim 5.

7. An image processing apparatus which corrects image data containing an image of a foreign substance and outputs corrected image data as a visible image, comprising:

an image information acquisition unit adapted to acquire information about the number of pixels of the image of the image data;

an output resolution acquisition unit adapted to acquire information about a resolution of the image to be output to the output device;

a foreign substance correction unit adapted to correct the image of the foreign substance contained in the image data; and a control unit adapted to control a correction operation of the foreign substance correction unit on the basis of at least the number of pixels and the information about the resolution;

wherein when the number of image pixels is larger than the number of output pixels which is based on the resolution, the control unit controls the foreign substance correction unit to correct a first number of images of the foreign substances, wherein when the number of image pixels is equal to or smaller than the number of output pixels which is based on the resolution, the control unit controls the foreign substance correction unit to correct a second number of images of the foreign substances, the first number of images of the foreign substances is larger than the second number of images of the foreign substances.

8. The apparatus according to claim 7, wherein the output device is a printer, and the information about the resolution is a printing paper size which is set by the user in the image processing apparatus as a size of a printing paper sheet to be output from the printer.

9. The apparatus according to claim 7, wherein the foreign substance correction unit executes correction based on at least position information of the image of the foreign substance contained in the image of the image data, the position information being recorded in association with the image data.

10. The apparatus according to claim 7, further comprising a display unit adapted to display the corrected image data corrected by the foreign substance correction unit and a position of correction.

11. A method of controlling an image processing apparatus which corrects image data containing an image of a foreign substance and outputs corrected image data as a visible image, comprising the steps of:

acquiring information about the number of pixels of the image of the image data;

acquiring information about a resolution of the image to be output to the output device;

correcting the image of the foreign substance contained in the image data; and a control unit adapted to control a correction operation of the foreign substance correction unit on the basis of at least the number of pixels and the information about the resolution;

wherein when the number of image pixels is larger than the number of output pixels which is based on the resolution, a first number of images of the foreign substances is corrected, wherein when the number of image pixels is equal to or smaller than the number of output pixels which is based on the resolution, a second number of images of the foreign substances is corrected, the first number of images of the foreign substances is larger than the second number of images of the foreign substances.

12. A non-transitory computer-readable storage medium storing a program causing a computer to execute a control method of claim 11.

* * * * *